(12) United States Patent
Stoica et al.

(10) Patent No.: US 12,339,770 B2
(45) Date of Patent: Jun. 24, 2025

(54) STORAGE OF THRESHOLD VOLTAGE SHIFTS

(71) Applicant: INTERNATIONAL BUSINESS MACHINES CORPORATION, Armonk, NY (US)

(72) Inventors: Radu Ioan Stoica, Zurich (CH); Nikolaos Papandreou, Thalwil (CH); Roman Alexander Pletka, Uster (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 18/483,578

(22) Filed: Oct. 10, 2023

(65) Prior Publication Data
US 2025/0117320 A1 Apr. 10, 2025

(51) Int. Cl.
G06F 12/02 (2006.01)

(52) U.S. Cl.
CPC .............................. G06F 12/0246 (2013.01)

(58) Field of Classification Search
CPC .................................................. G06F 12/0246
USPC ........................................................ 365/201
See application file for complete search history.

(56) References Cited

U.S. PATENT DOCUMENTS

| | | | |
|---|---|---|---|
| 5,881,242 A * | 3/1999 | Ku | H04L 45/00 |
| | | | 709/238 |
| 9,251,909 B1 | 2/2016 | Camp | |
| 9,799,405 B1 | 10/2017 | Micheloni | |
| 10,170,195 B1 | 1/2019 | Ioannou | |
| 10,658,054 B2 | 5/2020 | Ioannou | |
| 10,957,407 B1 | 3/2021 | Papandreou | |
| 2014/0258796 A1 | 9/2014 | Ghaly | |
| 2017/0358346 A1 | 12/2017 | Zhang | |

(Continued)

OTHER PUBLICATIONS

Li et al., "Shaving Retries with Sentinels for Fast Read over High-Density 3D Flash", 2020 53rd Annual IEEE/ACM International Symposium on Microarchitecture (MICRO), Downloaded: Oct. 2, 2023, https://ieeexplore.ieee.org/stamp/stamp.jsp?tp=&arnumber=9251942, pp. 483-495.

(Continued)

*Primary Examiner* — Ly D Pham
(74) *Attorney, Agent, or Firm* — Kristofer Haggerty

(57) ABSTRACT

The invention relates to a method of operating a memory device comprising memory cells for storing information on N voltage levels separated by N-1 threshold voltages, the method comprising: obtaining a plurality of threshold voltage shift (TVS) patterns, each comprising N-1 TVS reference values representing expected shifts of the threshold voltages of a set of memory cells having a specific physical condition; assigning a matching TVS pattern to the set of memory cells; storing differences between actual TVS values of the memory cells and corresponding TVS reference values of the matching TVS pattern as TVS residual values; upon a reading instruction for a specified memory cell, determining restored TVS values by combining the matching TVS pattern of the corresponding set of memory cells with corresponding TVS residual values; and reading the information from the specified cell using the restored TVS values.

19 Claims, 5 Drawing Sheets

(56) References Cited

U.S. PATENT DOCUMENTS

2021/0312961 A1\* 10/2021 Wu ................... G11C 11/4076
2022/0027083 A1 1/2022 Zuolo

OTHER PUBLICATIONS

Peleato et al., "Adaptive Read Thresholds for NAND Flash", IEEE Transactions on Communications, vol. 63, No. 9, Sep. 2015, https://www.researchgate.net/publication/281487974_Adaptive_read_thresholds_for_NAND_flash, pp. 3069-3081.
Zeng, "Using Machine Learning Techniques To Reduce SSD Costs", Flash Memory Summit 2019, Liteon, https://www.flashmemorysummit.com/Proceedings2019/08-07-Wednesday/20190807_CTRL-202-1_CloudZeng.pdf, 21 pages.

\* cited by examiner

STORAGE OF THRESHOLD VOLTAGE SHIFTS

BACKGROUND

The present invention relates to storage of threshold voltage shift values by which the optimal read threshold voltages of digital memory cells get shifted over time. Multi-level cells of a digital memory device, such as a NAND flash memory, are characterized by a set of predefined threshold voltages that separate voltage ranges corresponding to the different levels of storing information by the same cell. Immediately after programming, the optimal read threshold voltages ($V_T$) have known predefined nominal values. The optimal threshold voltages may change due to various effects (charge loss during retention, charge gain due to program-disturb or read-disturb, etc.). Therefore, repeated calibration of the optimal threshold voltages is an effective means to maintain a low residual bit-error rate (RBER). Newer memory technologies (e.g., 3D quad-level cell NAND flash memory) have been observed to be more sensitive to retention and program-erase (P/E) cycling effects.

Typically, the optimal voltage shift values are not the same for each threshold voltage. A memory controller (e.g., an SSD controller) may therefore be configured to accurately track changes in the optimal threshold values to be able to read data with a low number of errors. This may be accomplished by storing quantized delta changes called Threshold Voltage Shift (TVS) values that represent the difference between the current optimal threshold voltages and the initial nominal threshold voltages.

For instance, a quad-level cell adapted for storing m=4 bits of information may have $N=2^m=16$ voltage levels that are separated by N−1=15 threshold voltages. The number of threshold voltages that need to be tracked for each memory cell increases exponentially, e.g., 31 threshold voltages for a penta-level cell (PLC, m=5). The TVS values thus to be stored make up a large amount of metadata for which an efficient storage technique is desirable.

SUMMARY

In one aspect, the invention relates to a method of operating a digital memory device comprising memory cells, each of the memory cells being adapted for storing information on N voltage levels separated by N−1 threshold voltages, the method comprising:
obtaining a plurality of threshold voltage shift (TVS) patterns, each TVS pattern comprising N−1 TVS reference values representing respective expected shifts of the threshold voltages of a specified set of the memory cells having a specific physical condition;
performing an assignment routine comprising, for the specified set:
storing a reference to a matching TVS pattern for the specified set, the matching TVS pattern being selected from the plurality of TVS patterns; and
storing TVS residual values of the memory cells of the specified set, the residual values being determined as differences between actual TVS values of the memory cells and corresponding TVS reference values of the matching TVS pattern;
in response to receiving an instruction for reading information stored by a specified memory cell of the specified set, performing a readout routine comprising:
reading the matching TVS pattern of the specified set and some or all of the TVS residual values of the specified memory cell;
determining restored TVS values of the specified memory cell by combining the TVS reference values of the matching TVS pattern with corresponding read TVS residual values; and
reading the information from the specified memory cell using some or all of the restored TVS values.

In a further aspect, the invention relates to a memory controller, adapted for operating a digital memory device comprising memory cells, each of the memory cells being adapted for storing information on N voltage levels separated by N−1 threshold voltages, the operation of the digital memory device comprising performing a method comprising:
obtaining a plurality of threshold voltage shift (TVS) patterns, each TVS pattern comprising N−1 TVS reference values representing respective expected shifts of the threshold voltages of a specified set of the memory cells having a specific physical condition;
performing an assignment routine comprising, for the specified set:
storing a reference to a matching TVS pattern for the specified set, the matching TVS pattern being selected from the plurality of TVS patterns; and
storing TVS residual values of the memory cells of the specified set, the residual values being determined as differences between actual TVS values of the memory cells and corresponding TVS reference values of the matching TVS pattern;
in response to receiving an instruction for reading information stored by a specified memory cell of the specified set, performing a readout routine comprising:
reading the matching TVS pattern of the specified set and some or all of the TVS residual values of the specified memory cell;
determining restored TVS values of the specified memory cell by combining the TVS reference values of the matching TVS pattern with corresponding read TVS residual values; and
reading the information from the specified memory cell using some or all of the restored TVS values.

In a further aspect, the invention relates to a computer program product, comprising a computer readable storage medium having program instructions embodied therewith, the program instructions being executable by a memory controller to cause the memory controller to perform a method of operating a digital memory device comprising memory cells, each of the memory cells being adapted for storing information on N voltage levels separated by N−1 threshold voltages, the method comprising:
obtaining a plurality of threshold voltage shift (TVS) patterns, each TVS pattern comprising N−1 TVS reference values representing respective expected shifts of the threshold voltages of a specified set of the memory cells having a specific physical condition;
performing an assignment routine comprising, for the specified set:
storing a reference to a matching TVS pattern for the specified set, the matching TVS pattern being selected from the plurality of TVS patterns; and
storing TVS residual values of the memory cells of the specified set, the residual values being determined as differences between actual TVS values of the memory cells and corresponding TVS reference values of the matching TVS pattern;

in response to receiving an instruction for reading information stored by a specified memory cell of the specified set, performing a readout routine comprising:
reading the matching TVS pattern of the specified set and some or all of the TVS residual values of the specified memory cell;
determining restored TVS values of the specified memory cell by combining the TVS reference values of the matching TVS pattern with corresponding read TVS residual values; and
reading the information from the specified memory cell using some or all of the restored TVS values.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Figure 1:
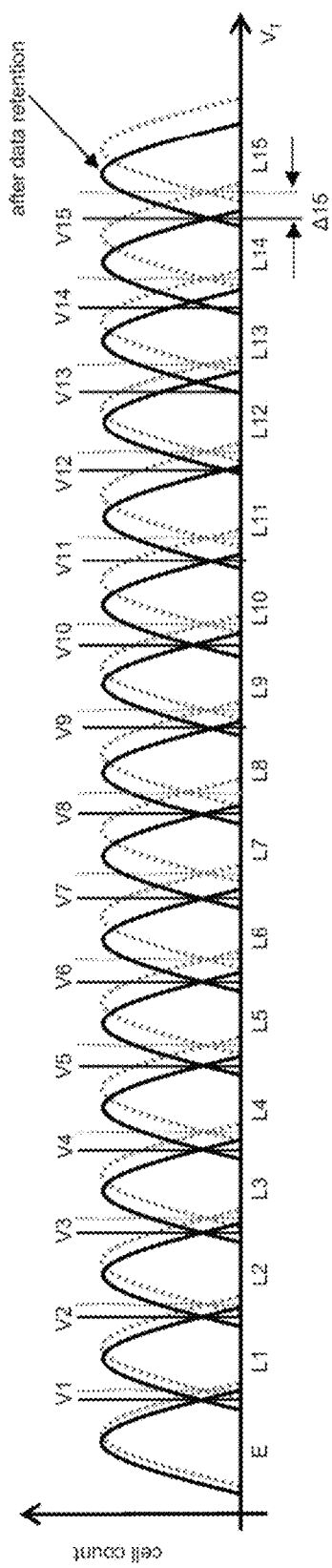
FIG. 1 depicts a diagram schematically illustrating an exemplary shift of threshold voltages.

Ongoing developments in memory technology include an increase of the number of voltage levels per memory cell. As the threshold voltages separating the read voltages of these levels may be subject to drift over time, affected memory devices such as solid-state drives (SSD) may need to store, cache, and update threshold voltage shift (TVS) values for the memory cells. With an increasing number of storage levels per cell, an increase of the portion of the total non-volatile memory capacity of a solid-state drive (SSD) to be reserved for storing TVS values, and/or of the amount of volatile memory to be provided for caching TVS values, may be required. Hence, it is desirable to have an efficient storage technique for TVS values.

The method of operating a digital memory device comprising memory cells disclosed herein (in the following also referred to as "the method") may be implemented using software running on and/or encoded by general and/or specialized information processing hardware, including but not limited to a storage controller and/or a generic processing unit such as a central processing unit (CPU). Hardware and/or software implementing the method may be located local to and/or remote from the multi-level cell memory device operated using the method (in the following also referred to as "the memory"), where implementing remote entities may be connected to the memory by communications infrastructure such as a network, a bus, etc. In the following, one or more memory cell(s) of the memory is/are also referred to as "the cell(s)".

The number of voltage levels per memory cell, N, is a natural number larger than one that may be, without limitation, an integer power m of two, i.e., $N=2^m$. The voltage levels are separated by N−1 threshold voltages that can be referred to by specific positions p. e.g., p=1, 2, ..., N−1. In the course of the method, a plurality of threshold voltage shift (TVS) patterns is obtained. For a given position p, a TVS pattern may contain a TVS reference value $V_T^*(p)$ indicating a presently presumed, expected, or model shift of the threshold voltage $V_T(p)$ at the given position p with respect to a known predefined nominal threshold voltage $\tilde{V}_T(p)$ specified, e.g., by a manufacturer of the memory.

A particular TVS pattern may be obtained using various approaches, including but not limited to reading a predefined TVS pattern from a memory, retrieving a predefined TVS pattern from a remote entity via communications infrastructure, calculating a TVS pattern using available pattern generation information, experimentally determining a TVS pattern by monitoring or analyzing a behavior of one or more memory cells, etc.

Certain memory cells, or groups of memory cells, may differ in their distribution of TVS values over the given positions p. These differences may reflect different possible physical conditions of memory cells, where similar cells may have similar TVS distributions that may be described by the same TVS pattern. Without limitation, such physical conditions may be descriptive of a usage history and/or a physical location of the cells described by a given TVS pattern. In other words, without limitation, memory cells that have been used in a similar manner (e.g., having similar numbers of read operations, write operations, or program/erase (PE) cycles, or similar times of data retention) or that have similar physical properties (e.g., storing the same number of bits of information and being part of similar layers) or that are located at specific positions within the memory (e.g., being close to specific electrical units such as electrical conductors or sources of magnetic fields, being close to physical memory regions having a different usage history, or sharing same structures such as the same wordline or part of neighboring wordlines) may show distinct, but mutually similar distributions of threshold voltage shifts that may be suitably described by the same TVS pattern.

A TVS pattern may be assigned to a memory cell or, more generally, to a group of memory cells (the "specified set" of memory cells). Without limitation, the assignment may be based on available information regarding the physical condition of the cell(s) to be assigned, or on a routine for finding a best-matching TVS pattern (e.g., by selecting a TVS pattern that best approximates the current optimal TVS values and therefore minimizes the TVS residual values). The assignment may be made, e.g., by a processor local to the memory or a remote processing node. Information descriptive of the assignment, e.g., a dataset identifying the specified set (e.g., using physical or logical addresses) and the assigned TVS pattern (e.g., using a suitable identifier), is written to the memory or a different local or remote memory reserved for storing TVS metadata. The assigned TVS pattern is selected from the given plurality of TVS patterns.

For each position p, a difference between the actual TVS value at the given position and the TVS reference value provided by the assigned TVS pattern (the "TVS residual value") is stored for the cells of the specified set. This may also be done using the memory or a different local or remote memory reserved for storing TVS metadata. One set of N−1 TVS residual values may be determined and stored for each cell separately, or may be stored for multiple cells if it can be assumed that said multiple cells have similar or identical TVS residual values over all positions p.

The assignment of the specified set and the matching TVS pattern may be stored together with the TVS residual values in a same data structure such as a database or a table (e.g., a block property table, if the specified set is a block of cells in the memory), or may be stored in separate data structures as considered appropriate.

Reading data from cell(s) of a given specified set of the memory in response to a read instruction may be accomplished by reading the TVS pattern assignment for the given specified set, reading one or more of the TVS reference values for the pattern, reading the TVS residual values for the cell(s) to be read out and combining the TVS values corresponding to the TVS pattern with the TVS residual values. Not necessarily do all TVS reference values and or all TVS residual values have to be read if only a subset of these values ("the needed values") is sufficient to correctly obtain the information to be read. The needed TVS residual value for a given position p may be combined with (e.g., added to) the respective TVS reference value of the matching TVS pattern at the given position p to obtain a restored TVS value at the given position p. A restored threshold voltage at the given position p may thus be determined by combining (e.g., adding) the restored TVS value at the given position p and the corresponding nominal value $\tilde{V}_T(p)$ of the threshold voltage at the given position p. Assuming that the restored threshold voltage at the given position p accurately reproduces the actual threshold voltage of the respective cell(s) to be read out at the given position p, the read instruction may be carried out at the given position p using the restored threshold voltage at the given position p.

Advantageously, the approach of storing an assignment of a specified set of memory cells to a TVS pattern selected from a given plurality of TVS patterns may reduce the memory consumption of storing TVS metadata compared to explicitly storing TVS values for the cells of the specified set. A reduction of processing resources may be achieved in comparison to determining a dedicated TVS pattern for each specified set of memory cells. Moreover, storing TVS residual values instead of explicit TVS values may save memory capacity by requiring a smaller bit width, as the TVS residual values may have smaller absolute values than the actual TVS values or the TVS reference values.

The method may be implementable in parallel to other existing or future TVS storage techniques. For example, TVS grouping may be applied as an independent TVS compression technique where threshold voltages having identical shifts are represented by a single TVS value instead of storing the same value for each individual TVS position.

In an example, the plurality of memory cells in the specified set is selected from the group consisting of a block, a page, a layer, and a wordline of the memory device. In this way, an algorithm implementing the method may use a hardware-determined segmentation of the memory, which may simplify and make more reliable the determination of the physical condition of the specified set. Moreover, such algorithm may be integrated more easily with existing routines based on said hardware-oriented memory segmentation, which may increase computing efficiency compared to non-hardware-oriented memory segmentation schemes.

In an example, the storing of the TVS residual values comprises storing identical TVS residual values for groups of memory cells assumed to have similar threshold voltage shifts. This may increase computational efficiency of the method by omitting potentially unnecessary computing steps such as calculating TVS residual values for positions having (almost) identical threshold voltage shifts. Information about cells having similar TVS values may be available from existing page-grouping schemes or other known effects of inter-cell coupling.

In an example, the physical condition is selected from the group consisting of a program/erase type, a retention type, and a read-disturb type. These physical conditions may be frequent in many memory types and may have distinct TVS patterns, which may allow for defining TVS patterns that may minimize the resulting TVS residual values more effectively. The physical condition may be known from usage statistics or, conversely, may be inferred for the cells of the given set by determining the matching TVS pattern and recording the physical condition represented by the matching TVS pattern as a hint on a likely actual physical condition of the cells in the given set.

In an example, the TVS residual values are stored with a predefined bit width smaller than a minimal bit width that would required for storing the actual TVS values of the memory cells. This may account for TVS residual values being systematically smaller in their absolute values than actual TVS values if the TVS patterns available for being selected reproduce the actual TVS behavior of the cells sufficiently well. Storing TVS residual values with a smaller bit width may reduce the memory capacity needed for accurately keeping track of threshold voltage shifts in the memory.

In an example, the TVS residual values are stored in a first group of TVS residual values using a first bit width and in a second group of TVS residual values having a second bit width differing from the first bit width. This may allow for defining one of the first and the second group with a smaller bit width instead of assuming a larger single bit width for all positions. In this manner, memory demand of the method may be reduced further. It may be advantageous to subdivide the TVS residual values into more than two groups if necessary.

In an example, one or both of the first bit width and the second bit width are minimized to correspond to a maximum expected deviation from the TVS pattern. This may decrease the memory requirement for TVS management even further. The maximum expected deviation may be obtained using, e.g., a statistical analysis of TVS values that were recorded at the different threshold voltage positions for a large number of cells. This may enable an identification of positions where a larger bit width appears feasible, and other positions where the deviations are typically so small that a smaller bit width can be used.

In a practical example, statistical observations of a real memory with N=16 voltage levels suggest that it appears possible to reserve 7 bits for the TVS residual values for one or more of the positions, while 4 bits appear sufficient for storing the TVS residual values for the rest of the positions. Compared to TVS storage approaches with a standard bit width of 8 bits, savings in memory consumption may come up to closely below 50 percent depending on the number of positions in the first group and the total number of threshold voltage positions.

In an example, the number of TVS patterns is not larger than 1024. This may increase efficiency of the method by ensuring that not too large a number of TVS patterns needs to be tested to find a satisfactory assignment, and that additional computational effort for managing (e.g., updating, adding, or removing) the plurality if TVS patterns stays limited. In a practical example, performance observations of the method using a real memory with N=16 voltage levels suggest that an effective TVS management may still be achieved with a total number of TVS patterns such as 128. This value may depend on the memory technology implemented by the memory device. In another practical example, the memory device implements a flash memory technology and evidence suggests that a total number of TVS patterns exceeding 1024 may be unnecessary irrespective of the implemented flash technology.

In an example, the obtainment of the TVS patterns comprises, for a given one of the TVS patterns, performing an obtainment routine selected from the group consisting of:
reading the given TVS pattern from a local storage location of the memory device;
generating the given TVS pattern using a formula specific to the physical condition to be represented by the given TVS pattern;
receiving the given TVS pattern via a network connection or as part of a firmware update; and
determining the TVS reference values of the given TVS pattern by averaging corresponding actual TVS values for a test group of the memory cells having a same physical condition and similar actual TVS values.

Reading a TVS pattern from a local storage location may be a fast and efficient way to obtain a TVS pattern for most cases of use. Generating a TVS pattern from a formula from which the TVS reference values can be calculated may be efficient in memory consumption if, e.g., only a small number of coefficients of the formula have to be stored instead of explicitly storing the TVS reference values of the given TVS pattern. TVS pattern generator formulas may be especially beneficial when handling a large total number of TVS patterns and/or a large number N of voltage levels, where "large" denotes a factor of ten or more. Receiving the given TVS pattern via a network connection (e.g., on a regular or scheduled basis) may reduce computational load for a local memory controller of the memory for generating updated TVS patterns, and/or may allow for deducing new TVS patterns from a larger number of specified sets of cells than a local memory controller could reasonably handle without substantially slowing down other memory management processes. Receiving the given TVS pattern as part of a firmware update may help ensure a high quality of TVS management even if no network connection is available. Locally or remotely determining a TVS pattern may have the advantage of maintaining a current base for the TVS patterns, which may increase the frequency of finding a matching TVS pattern that, compared to other TVS patterns from the plurality of TVS patterns, minimizes the TVS residual values for a newly assigned specified set of cells.

In an example, the method further comprises, for a given one of the TVS patterns, obtaining an updated TVS pattern for the physical condition represented by the given TVS pattern, and replacing the given TVS pattern by the updated TVS pattern. An updated TVS pattern may be obtained by locally or remotely monitoring threshold voltage statistics for the memory or, e.g., multiple memory devices having a same memory type as the memory. This may contribute to a higher effectivity of the method by ensuring that the TVS patterns are in close correspondence to actual memory conditions, which may minimize the TVS residual values for many memory cells.

In an example, the method further comprises obtaining an additional TVS pattern and adding the additional TVS pattern to the plurality of TVS patterns. Statistics of TVS residual values indicating that the number of specified sets having comparably large TVS residual values may point out that none of the existing TVS patterns may be close enough to the actual physical condition of these cells to yield minimal TVS residual values. In this case, for instance, an additional TVS pattern may be obtained by locally or remotely monitoring threshold voltage statistics for the memory or, e.g., multiple memory devices having a same memory type as the memory. This may contribute to a higher effectivity of the method by ensuring that the TVS patterns are in close correspondence to actual memory conditions, which may minimize the TVS residual values for many memory cells.

In an example, the method further comprises removing a TVS pattern from the plurality of TVS patterns and subsequently repeating the assignment routine for all specified sets assigned to the removed TVS pattern. Usage statistics of TVS patterns may show that a particular TVS pattern is used too seldom, e.g., less than a predefined threshold value of times. This may point out that the too rarely used TVS pattern does not adequately represent actual physical conditions for most memory cells. In this case, for instance, it may be beneficial to remove the rarely used TVS pattern from the plurality of TVS patterns either to ensure an efficient assignment routine that does not waste time on checking TVS patterns for a possible assignment that are unlikely to match actual physical conditions of the cells or to ensure the TVS patterns can be cached in a fast volatile memory of limited capacity. When a TVS pattern is removed, reassigning the specified sets of cells that were previously assigned to the removed TVS pattern to other matching TVS patterns may ensure that TVS monitoring is continued for there memory cells.

In an example, the readout routine further comprises monitoring an error rate for the specified set, the method further comprising repeating the assignment routine for the specified set if the error rate exceeds a predefined threshold value. An increasing error rate for a given specified set of cells may be a sign of a proceeding threshold voltage shift that is not adequately reproduced by the TVS pattern currently assigned to the given specified set. A reassignment may thus help find a TVS pattern that more precisely represents the current physical condition of the cells in the given specified set. This may ensure a high effectiveness of the method and may continue to minimize the TVS residual values for the given specified set.

In an example, the selection of the matching TVS pattern is based on minimizing the TVS residual values for the specified set. For instance, a minimization of the TVS residual values may be determined by calculating an aggregate residual measure such as a sum of absolute values of the TVS residual values over all positions, or a sum of squares of the TVS residual values over all positions. Minimizing the TVS residual values may provide experimental proof for selecting a particular TVS pattern as the matching TVS pattern for a given specified set of cells. This may maximize the duration of validity of the assignment, which may maximize the time before a reassignment of a new TVS pattern to the given specified set of cells becomes necessary, and may thus increase computational efficiency of the method.

In an example, the selection of the matching TVS pattern is based on comparing the physical condition of a given one of the TVS patterns to a recorded physical condition of the specified set. Comparing available data on the physical condition of a given specified set (e.g., based on usage statistics, data retention time, number of read operations, and physical properties of the memory cells) may avoid an experimental determination of a matching TVS pattern, or may shorten the experimental determination of the matching TVS pattern by reducing the number of assignment possibilities. Both cases may result in an increased computational efficiency of the method.

In an example, the memory device is a flash memory device comprising a flash memory as a primary storage medium, the reference to the matching TVS pattern and the TVS residual values (together the "TVS metadata") being stored in and read from a local volatile memory of the memory device, the method further comprising storing a persistent copy of the TVS patterns and, for each specified set of memory cells, the reference to the matching TVS pattern and the TVS residual values in the flash memory. Storing TVS metadata in a local volatile memory may increase computational performance of the method, assuming that volatile memory is faster than the flash memory. Keeping a backup of the TVS metadata in the flash memory may ensure that the TVS metadata is still available if the volatile memory is cleared, e.g., during a loss of electrical power, which may ensure operability of the memory despite using a volatile memory during normal operation.

In an example, the TVS residual values are stored using a quantization coarser than a predefined quantization for storing the TVS reference values. This may further reduce the required memory overhead for storing the TVS residual values. For instance, the TVS residual values may be stored in a numerical format that is one or more digits shorter than the format used for storing the TVS reference values. In another example, the TVS residual values may be stored as integers representing multiples of a predefined first quantization step size that is specific to storing the TVS residual values and is greater than a predefined second quantization step size specific to storing the TVS reference values. The combined TVS reference values with the TVS residuals may have a bounded deviation from the optimal TVS values, however, this might be an acceptable tradeoff between an increase in the bit error count and a reduction in the TVS metadata size. A small deviation from the optimal TVS values may be mitigated through orthogonal techniques that dynamically fine tune the TVS values during a read operation.

Now turning to the drawings, FIG. 1 depicts two schematic statistical distributions of a group of 16-level memory cells (quad-level cells, QLC) where the x axis shows a readout voltage applied to the cells and the y axis shows the number of cells having a voltage level centered at the respective voltage on the x axis. The distributions show 16 local maxima corresponding to the respective voltage levels E, L1, . . . , L15 and the threshold voltages are located at the local minima between the voltage levels. The threshold voltages are numbered V1 . . . . V15 with positions p=1 . . . 15 ordered by increasing voltage. A first distribution is drawn with a dotted line and represents new memory cells where the local maxima are centered about nominal values of the voltage levels (not shown) and the threshold voltages have nominal values indicated by vertical lines representing effective or average threshold voltages of the entire group of memory cells. A second distribution is drawn with a solid line and represents the memory cells after having been used over a certain amount of time for data retention. The local maxima and the threshold voltages of the second distribution are shifted from the first distribution by cell-individual voltage shifts. The shifts in the voltages may be uneven and may have a positive or negative sign, and some of the voltages may be shifted much more than others.

Figure 2:
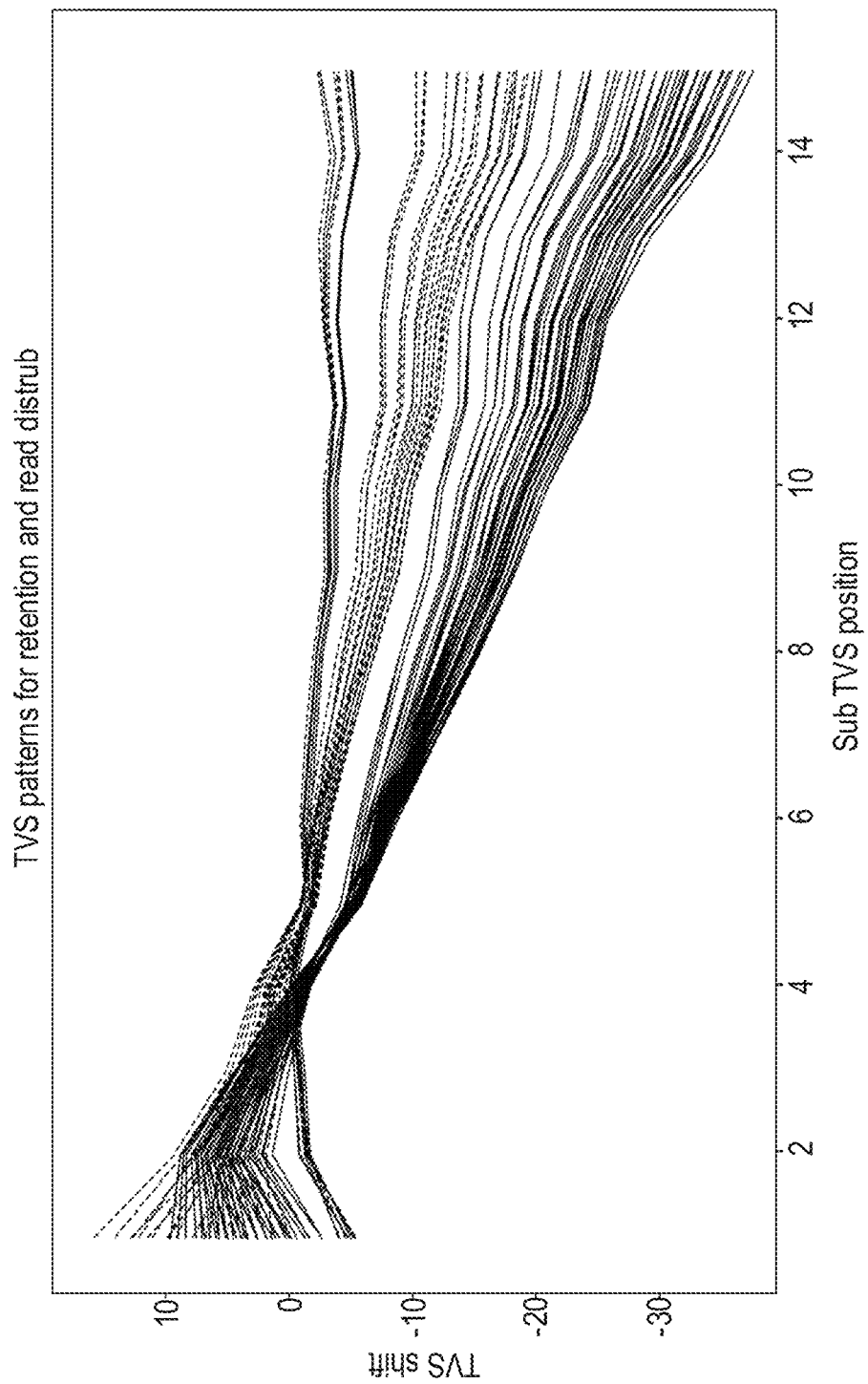
FIG. 2 depicts a diagram with a family of curves representing an exemplary plurality of TVS patterns.

FIG. 2 is a diagram of an exemplary plurality of 62 TVS patterns 200 for a QLC memory. 40 TVS patterns 200 represent memory cells whose physical condition is mainly characterized by data retention effects (solid lines) and 22 TVS patterns 200 represent memory cells whose physical condition is mainly characterized by read-disturb effects (dashed lines). The diagram shows the TVS reference values at each position p (x axis) in terms of voltage channels (y axis), connected by a line for each TVS pattern 200. The TVS patterns 200 show variable but mainly positive TVS reference values at positions 1 to 4, and a decreasing or close to zero trend at positions 5 to 15. The shifts for the retention-type TVS patterns 200 are mostly more pronounced than those for the read-disturb-type TVS patterns 200.

Figure 3:
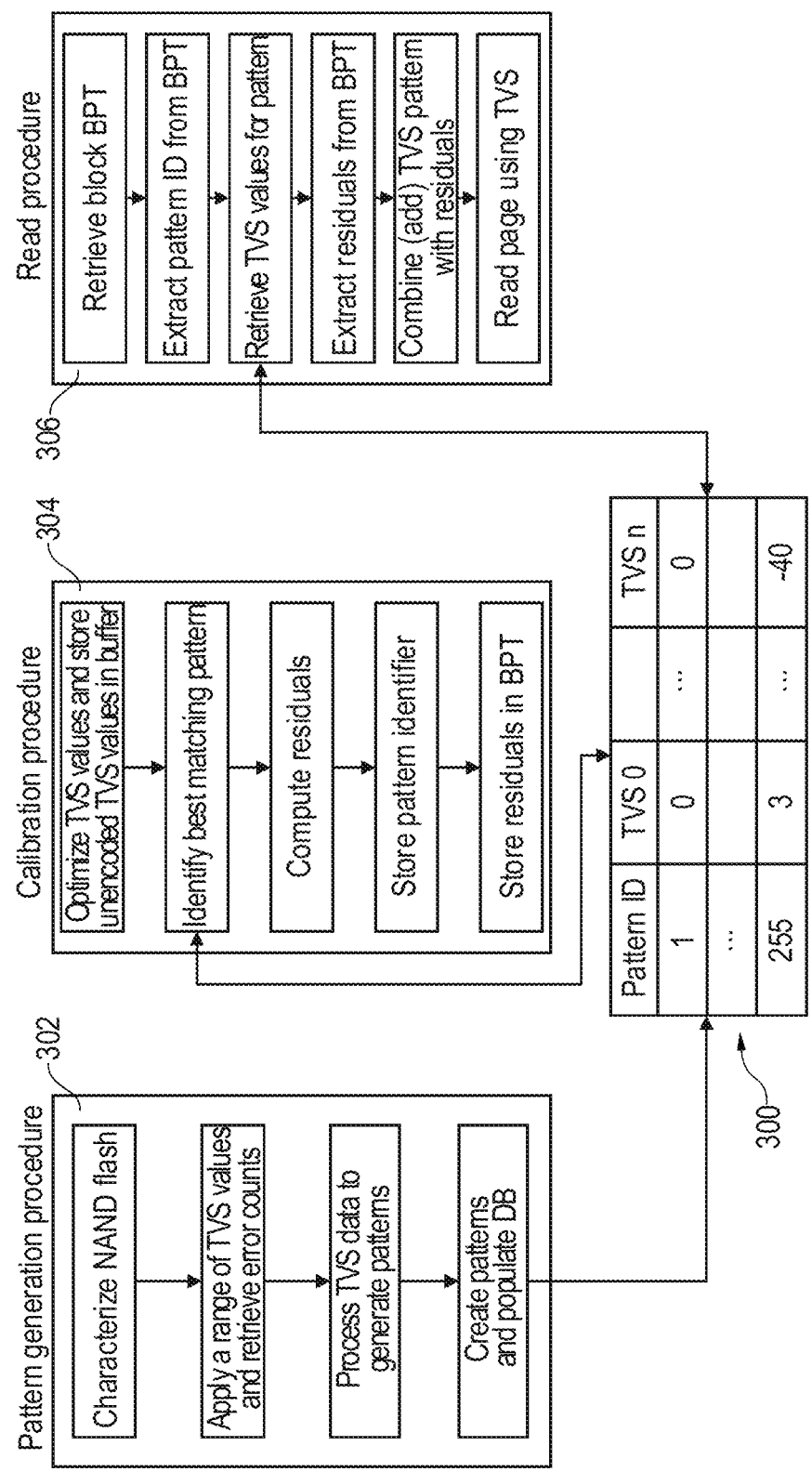
FIG. 3 depicts exemplary steps of procedures for generating and calibrating TVS patterns, and of a readout routine.

FIG. 3 shows steps of exemplary procedures or routines that may be implemented as parts of a memory operation or memory management technique making use of TVS patterns. An exemplary routine 302 of generating a TVS pattern based on a given specified set of memory cells identifies a memory type of the memory containing the given specified set. Only for illustrative purposes, the memory is referred to as a NAND flash memory in this drawing, which is a specific choice of implementation that does not preclude other types of multi-level cell memory for which the techniques disclosed herein can be applied as well. The TVS pattern is then generated experimentally by varying TVS values for repeated read and/or write operation(s) and receiving corresponding error counts in response thereto; and trying to identify a combination of TVS reference values that, e.g., minimize the error count on the given specified set. Such minimization may be performed, e.g., iteratively by varying the set of prospect TVS reference values until a set of final TVS reference values is reached where the error count fulfils a stationarity criterion, or subsequently by analyzing correlations between observed error counts and respective prospect TVS reference values for each position and setting the final TVS reference values to a set of values that most probably minimizes the error count based on the obtained correlations for the different positions. The set of final TVS reference values may be assigned a unique identifier ("pattern ID" in the drawing) and stored together with the identifier and optionally further information (such as the physical condition represented by the newly generated pattern) in a data structure 300 locally or remotely provided for storing TVS metadata. Only for illustrative purposes, such data structure 300 is referred to as a block property table (BPT) in this drawing, which is a specific choice of implementation that does not preclude other types of data structure with which the techniques disclosed herein can be implemented as well.

An exemplary routine 304 of assigning a TVS pattern to a given specified set of memory cells (called "calibration procedure" in the drawing and also referred to herein as an "assignment routine") comprises an optimization step of determining a set of actual TVS values of the given specified set by, e.g., minimizing an error count for repeated read and/or write operation(s). One or more of the TVS patterns currently maintained in the data structure 300 may be compared to the previously determined set of actual TVS values, e.g., by calculating TVS residual values for this combination, i.e., calculating a difference between the actual TVS value and the corresponding TVS reference value of the given TVS pattern for each position p. A matching TVS pattern may then be identified as, e.g., the TVS pattern that minimizes the residuals for the given specified set. For instance, a minimization of the TVS residual values may be determined by calculating an aggregate residual measure such as a sum of absolute values of the TVS residual values over all positions, or a sum of squares of the TVS residual values over all positions, or by counting the number of bits required to represent all or each of the TVS residual values. An assignment of the identifier for the matching TVS pattern may then be stored, together with the TVS residual values of the given specified set relative to the matching TVS pattern, at a suitable location, e.g., in a BPT or a different local or remote data structure provided for storing memory metadata.

An exemplary routine 306 of reading information from one or more memory cells of a given specified set comprises retrieving the memory metadata for the given specified set (e.g., the BPT) and reading therefrom the identifier of the assigned TVS pattern and the TVS residual values of the given specified set of memory cells relative to the assigned matching TVS pattern. In addition, the TVS reference values of the matching TVS pattern may be retrieved from the TVS metadata structure 300. A set of restored threshold voltages may then be obtained by adding, for each position p, the nominal threshold voltage, the TVS reference value of the matching TVS pattern, and the TVS residual value of the given specified set for the given position p. A read command may then be executed for the one or more memory cells using the restored threshold voltages, assuming that the restored threshold voltages are still reproducing the actual threshold voltages of the cells of the given set without a significant increase of the error rate. It shall be understood that a write command may be executed analogously by replacing the reference above to a read command by a write command; and that the one or more memory cells do not necessarily have to be equal to the entire given specified set of memory cells, but may rather be a non-empty, non-identical subset thereof (e.g., a page to be read from a block being used as the specified set), and that the drawing referring to reading a page does not preclude reading or writing different subsets of the given specified set as desired and implementable on the hardware structure of the memory.

Figure 4:
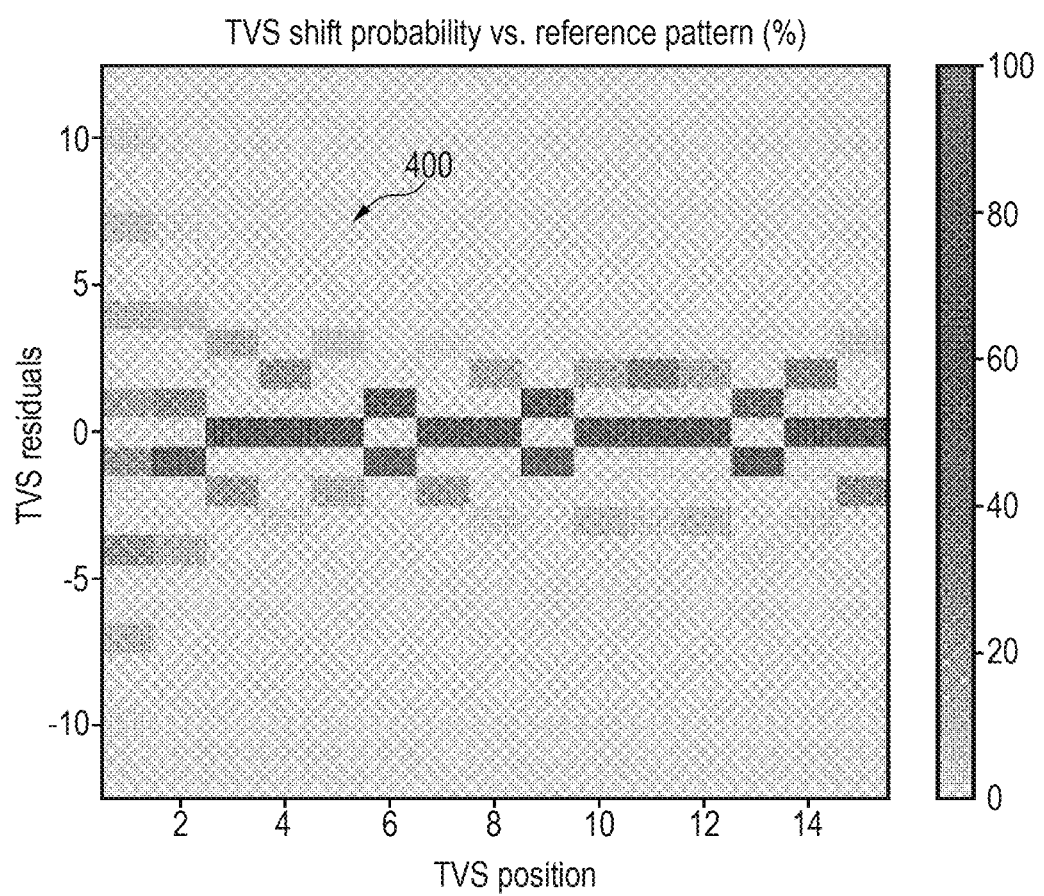
FIG. 4 depicts a diagram illustrating an exemplary probability distribution of TVS residual values.

FIG. 4 is a heatmap-type diagram of an exemplary statistical distribution of a frequency of occurrence of TVS residual values 400 (scale from 0 to 100% to the right) as a function of the threshold voltage position p obtained from statistical analysis of TVS metadata collected for a real QLC memory. The distribution shows an asymptotic behavior with comparably large residuals 400 in the range ±10 channels at position 1, ±4 channels at position 2, and ±3 channels at positions 3 . . . 15. This may be interpreted as an indication that for the first one or two positions, a larger bit width may be reserved for storing the TVS residual values 400 than for the other positions 2 or 3 to 15.

The disclosed representation and storage of TVS values using patterns and residual values may be orthogonal and may be used in conjunction with other TVS metadata reduction techniques. A non-exhaustive list of other TVS grouping techniques that may be used in conjunction includes: TVS grouping techniques which store a single set of TVS values for a set of cells or cell groups (e.g., pages) with similar physical conditions as described herein; storing of a single TVS value for multiple voltage thresholds; increasing the TVS quantization which involves storing larger default TVS step changes than specified by the manufacturer of the memory. Other TVS grouping techniques may reduce TVS metadata size at the cost of an increased error count when reading the data. The presently disclosed method may allow to further reduce the TVS metadata size with no additional error count increases.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
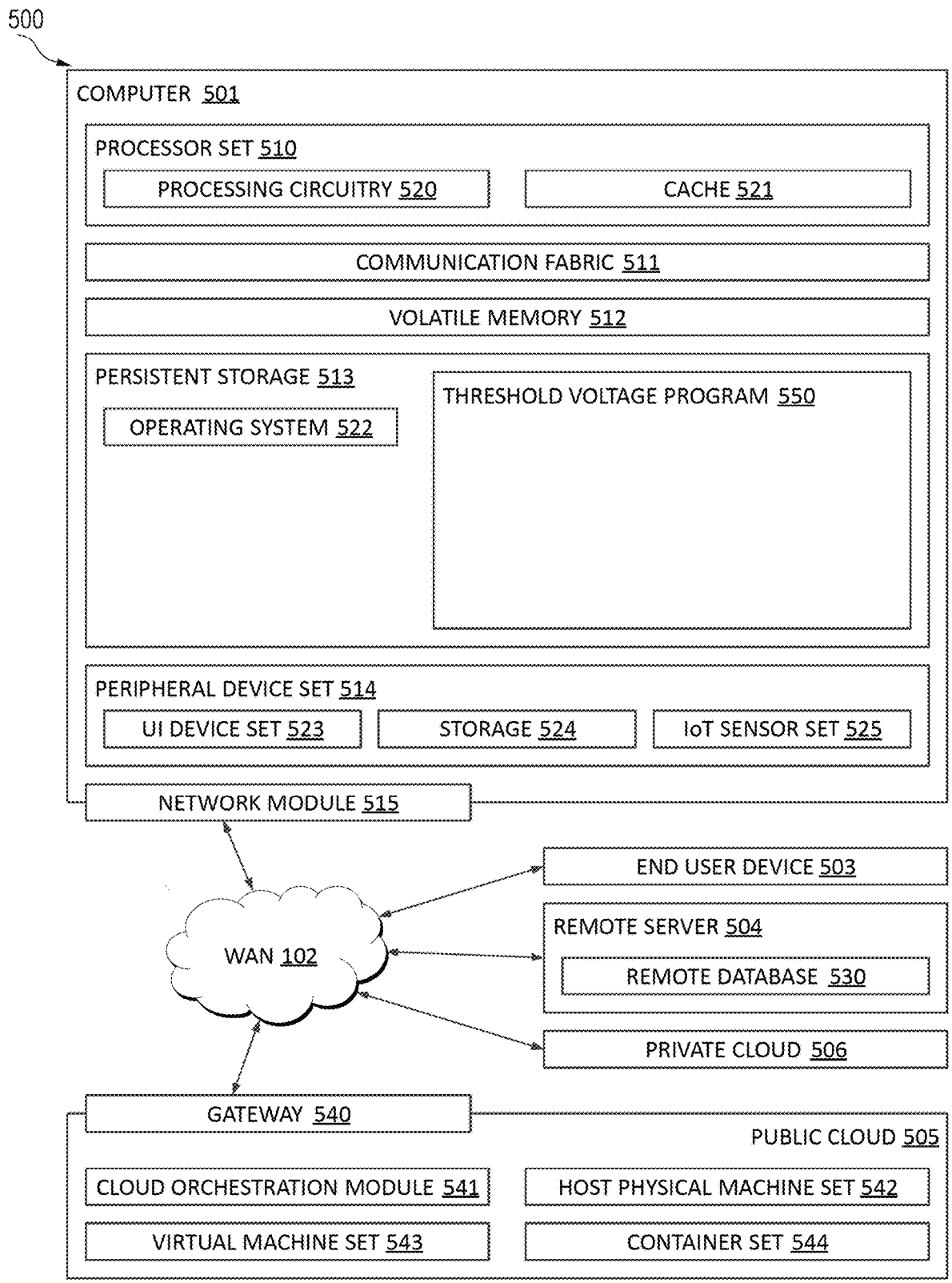
FIG. 5 depicts an exemplary block diagram depicting the components of computing environment 500, in accordance with the exemplary embodiments.

With reference now to FIG. 5, computing environment 500 contains an example of an environment for the execution of at least some of the computer code involved in performing the inventive methods, such as threshold voltage program 550. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A method of operating a digital memory device comprising memory cells, each of the memory cells being adapted for storing information on N voltage levels separated by N−1 threshold voltages, the method comprising:
   obtaining a plurality of threshold voltage shift (TVS) patterns, each TVS pattern comprising N−1 TVS reference values representing respective expected shifts of the threshold voltages of a specified set of the memory cells having a specific physical condition;
   performing an assignment routine comprising, for the specified set:
      storing a reference to a matching TVS pattern for the specified set, the matching TVS pattern being selected from the plurality of TVS patterns; and
      storing TVS residual values of the memory cells of the specified set, the residual values being determined as differences between actual TVS values of the memory cells and corresponding TVS reference values of the matching TVS pattern;
   in response to receiving an instruction for reading information stored by a specified memory cell of the specified set, performing a readout routine comprising:
      reading the matching TVS pattern of the specified set and some or all of the TVS residual values of the specified memory cell;
      determining restored TVS values of the specified memory cell by combining the TVS reference values of the matching TVS pattern with corresponding read TVS residual values; and
      reading the information from the specified memory cell using some or all of the restored TVS values.

2. The method of claim 1, the plurality of memory cells in the specified set being selected from the group consisting of a block, a page, a layer, and a wordline of the memory device.

3. The method of claim 1, the storing of the TVS residual values comprising storing identical TVS residual values for groups of memory cells assumed to have similar threshold voltage shifts.

4. The method of claim 1, the physical condition being selected from the group consisting of a program type, an erase type, a retention type, and a read-disturb type.

5. The method of claim 1, the TVS residual values being stored with a predefined bit width smaller than a minimal bit width that would required for storing the actual TVS values of the memory cells.

6. The method of claim 1, the TVS residual values being stored in a first group of TVS residual values using a first bit width and in a second group of TVS residual values having a second bit width differing from the first bit width.

7. The method of claim 6, one or both of the first bit width and the second bit width being minimized to correspond to a maximum expected deviation from the TVS pattern.

8. The method of claim 1, the number of TVS patterns being not larger than 1024.

9. The method of claim 1, the obtainment of the TVS patterns comprising, for a given one of the TVS patterns, performing an obtainment routine selected from the group consisting of:
    reading the given TVS pattern from a local storage location of the memory device;
    generating the given TVS pattern using a formula specific to the physical condition to be represented by the given TVS pattern;
    receiving the given TVS pattern via a network connection or as part of a firmware update; and
    determining the TVS reference values of the given TVS pattern by averaging corresponding actual TVS values for a test group of the memory cells having a same physical condition and similar actual TVS values.

10. The method of claim 1, further comprising, for a given one of the TVS patterns, obtaining an updated TVS pattern for the physical condition represented by the given TVS pattern, and replacing the given TVS pattern by the updated TVS pattern.

11. The method of claim 1, further comprising obtaining an additional TVS pattern and adding the additional TVS pattern to the plurality of TVS patterns.

12. The method of claim 1, further comprising removing a TVS pattern from the plurality of TVS patterns and subsequently repeating the assignment routine for all specified sets assigned to the removed TVS pattern.

13. The method of claim 1, the readout routine further comprising monitoring an error rate for the specified set, the method further comprising repeating the assignment routine for the specified set if the error rate exceeds a predefined threshold value.

14. The method of claim 1, the selection of the matching TVS pattern being based on minimizing the TVS residual values for the specified set.

15. The method of claim 1, the selection of the matching TVS pattern being based on comparing the physical condition of a given one of the TVS patterns to a recorded physical condition of the specified set.

16. The method of claim 1, the memory device being a flash memory device comprising a flash memory as a primary storage medium, the reference to the matching TVS pattern and the TVS residual values being stored in and read from a local volatile memory of the memory device, the method further comprising storing a persistent copy of the TVS patterns and, for each specified set of memory cells, the reference to the matching TVS pattern and the TVS residual values in the flash memory.

17. The method of claim 1, the TVS residual values being stored using a quantization coarser than a predefined quantization for storing the TVS reference values.

18. A memory controller, adapted for operating a digital memory device comprising memory cells, each of the memory cells being adapted for storing information on N voltage levels separated by N−1 threshold voltages, the operation of the digital memory device configured to:
    obtain a plurality of threshold voltage shift (TVS) patterns, each TVS pattern comprising N−1 TVS reference values representing respective expected shifts of the threshold voltages of a specified set of the memory cells having a specific physical condition;
    perform an assignment routine configured to, for the specified set:
        store a reference to a matching TVS pattern for the specified set, the matching TVS pattern being selected from the plurality of TVS patterns; and
        store TVS residual values of the memory cells of the specified set, the residual values being determined as differences between actual TVS values of the memory cells and corresponding TVS reference values of the matching TVS pattern;
    in response to receiving an instruction for reading information stored by a specified memory cell of the specified set, perform a readout routine configured to:
        read the matching TVS pattern of the specified set and some or all of the TVS residual values of the specified memory cell;
        determine restored TVS values of the specified memory cell by combining the TVS reference values of the matching TVS pattern with corresponding read TVS residual values; and
        read the information from the specified memory cell using some or all of the restored TVS values.

19. A computer program product, comprising a computer readable storage medium having program instructions embodied therewith, the program instructions being executable by a memory controller to cause the memory controller to operate a digital memory device comprising memory cells, each of the memory cells being adapted for storing information on N voltage levels separated by N−1 threshold voltages, the operation of the digital memory device configured to:
    obtain a plurality of threshold voltage shift (TVS) patterns, each TVS pattern comprising N−1 TVS reference values representing respective expected shifts of the threshold voltages of a specified set of the memory cells having a specific physical condition;
    perform an assignment routine configured to, for the specified set:
        store a reference to a matching TVS pattern for the specified set, the matching TVS pattern being selected from the plurality of TVS patterns; and
        store TVS residual values of the memory cells of the specified set, the residual values being determined as differences between actual TVS values of the memory cells and corresponding TVS reference values of the matching TVS pattern;
    in response to receiving an instruction for reading information stored by a specified memory cell of the specified set, perform a readout routine configured to:
        read the matching TVS pattern of the specified set and some or all of the TVS residual values of the specified memory cell;
        determine restored TVS values of the specified memory cell by combining the TVS reference values of the matching TVS pattern with corresponding read TVS residual values; and read the information from the specified memory cell using some or all of the restored TVS values.

\* \* \* \* \*